(12) United States Patent
Vijaya Kumar et al.

(10) Patent No.: US 12,641,401 B2
(45) Date of Patent: May 26, 2026

(54) SIGNAL TRANSMISSION CONTROL FOR VEHICLE-TO-EVERYTHING (V2X) COMMUNICATION

(71) Applicant: GM GLOBAL TECHNOLOGY OPERATIONS LLC, Detroit, MI (US)

(72) Inventors: Vivek Vijaya Kumar, Shelby Township, MI (US); Hariharan Krishnan, Troy, MI (US); Mohammad Naserian, Windsor (CA); Curtis L. Hay, Petoskey, MI (US); Priya Biby Abraham, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 370 days.

(21) Appl. No.: 18/335,313

(22) Filed: Jun. 15, 2023

(65) Prior Publication Data

US 2024/0422513 A1    Dec. 19, 2024

(51) Int. Cl.
*H04W 4/40* (2018.01)
*H04W 4/021* (2018.01)

(52) U.S. Cl.
CPC ............. *H04W 4/40* (2018.02); *H04W 4/021* (2013.01)

(58) Field of Classification Search
CPC ..... H04W 4/021; H04W 4/023; H04W 4/029; H04W 4/40
USPC ......................................................... 370/310
See application file for complete search history.

(56) References Cited

U.S. PATENT DOCUMENTS

| | | | | | |
|---|---|---|---|---|---|
| 11,218,836 | B1 * | 1/2022 | Ilieva | ..................... | H04W 4/021 |
| 11,965,974 | B2 * | 4/2024 | Ivanov | ................ | G01S 5/02526 |
| 2017/0243485 | A1 * | 8/2017 | Rubin | ...................... | H04W 4/46 |
| 2018/0234913 | A1 * | 8/2018 | Kahtava | ................ | H04W 8/005 |
| 2018/0270624 | A1 * | 9/2018 | Lee | ..................... | H04L 65/1063 |
| 2018/0302768 | A1 * | 10/2018 | Uchiyama | ......... | H04W 52/0216 |
| 2019/0035277 | A1 * | 1/2019 | Son | ......................... | G08G 1/163 |
| 2020/0059813 | A1 * | 2/2020 | Park | ........................ | H04W 4/46 |
| 2020/0219401 | A1 * | 7/2020 | Ren | ......................... | H04W 4/021 |
| 2020/0374342 | A1 * | 11/2020 | Chen | ......................... | H04W 4/44 |
| 2021/0127232 | A1 * | 4/2021 | Zimroni | ................ | H04W 4/021 |
| 2021/0262820 | A1 * | 8/2021 | Chhajer | ................ | G06F 3/1462 |
| 2021/0383696 | A1 * | 12/2021 | Park | ................. | G08G 1/096716 |
| 2022/0060846 | A1 * | 2/2022 | Carraway | .............. | H04W 4/021 |
| 2023/0019552 | A1 * | 1/2023 | Shin | ....................... | B60W 50/12 |
| 2023/0107147 | A1 * | 4/2023 | Song | ..................... | H04W 4/021 |
| | | | | | 370/329 |

(Continued)

FOREIGN PATENT DOCUMENTS

| | | | | | | |
|---|---|---|---|---|---|---|
| CN | 113879288 | B | * | 7/2023 | ........... | B60W 30/06 |
| CN | 113721621 | B | * | 5/2024 | .......... | G05D 1/0276 |
| CN | 113491153 | B | * | 10/2024 | ........... | H04W 72/54 |

*Primary Examiner* — Jean A Gelin

(57) ABSTRACT

A method of controlling communication signal transmission in vehicle-to-everything (V2X) communication includes obtaining a prohibited V2X communication map, the prohibited V2X communication map including locations of multiple geo-fence boundaries for regions in which V2X communication signal transmission is prohibited, obtaining a current location of a vehicle, determining a distance of the vehicle from a nearest one of the multiple geo-fence boundaries, and inhibiting transmission of V2X communication signals from at least one antenna of the vehicle in response to a determination that the distance of the vehicle is less than a specified boundary distance threshold value.

18 Claims, 5 Drawing Sheets

(56) References Cited

U.S. PATENT DOCUMENTS

| | | | |
|---|---|---|---|
| 2023/0109635 A1* | 4/2023 | Palermo ............ | H04B 7/18519 455/13.1 |
| 2023/0179969 A1* | 6/2023 | Pateromichelakis ....................... | H04L 41/0894 370/329 |
| 2023/0264718 A1* | 8/2023 | Moon ................. | G08G 1/0112 701/24 |

* cited by examiner

SIGNAL TRANSMISSION CONTROL FOR VEHICLE-TO-EVERYTHING (V2X) COMMUNICATION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure generally relates to signal transmission control for vehicle-to-everything (V2X) communication, including geo-fence boundaries for prohibited V2X communication.

Vehicle-to-everything (V2X) communication allows vehicles to communicate with one another. For example, a V2X system may transmit/broadcast a basic safety message at, e.g., 10 Hz. However, V2X signal transmission may not be allowed in certain places, such as areas that are V2X sensitive (e.g., were V2X signals may interfere with defense communications and other priority communications), and countries/regions where V2X transmission is not authorized (such as border crossings).

SUMMARY

A method of controlling communication signal transmission in vehicle-to-everything (V2X) communication includes obtaining a prohibited V2X communication map, the prohibited V2X communication map including locations of multiple geo-fence boundaries for regions in which V2X communication signal transmission is prohibited, obtaining a current location of a vehicle, determining a distance of the vehicle from a nearest one of the multiple geo-fence boundaries, and inhibiting transmission of V2X communication signals from at least one antenna of the vehicle in response to a determination that the distance of the vehicle is less than a specified boundary distance threshold value.

In other features, the specified boundary distance threshold value is a first specified boundary distance threshold value, and the method includes allowing transmission of V2X communication signals while the distance of the vehicle is greater than a second specified boundary distance threshold value, the second specified boundary distance threshold value greater than the first specified boundary distance threshold value.

In other features, the method includes determining whether the vehicle is currently transmitting or receiving an active event V2X communication signal, inhibiting transmission of V2X communication signals in response to a determination that the distance of the vehicle is between the first specified boundary distance threshold value and the second specified boundary distance threshold value, and the vehicle is not currently transmitting or receiving an active event V2X communication signal, and allowing transmission of V2X communication signals in response to a determination that the distance of the vehicle is between the first specified boundary distance threshold value and the second specified boundary distance threshold value, and the vehicle is currently transmitting or receiving an active event V2X communication signal.

In other features, the method includes adjusting at least one of a strength of transmission of V2X communication signals and a direction of transmission of V2X communication signals, in response to the determination that the distance of the vehicle is between the first specified boundary distance threshold value and the second specified boundary distance threshold value, and the vehicle is currently transmitting or receiving an active event V2X communication signal.

In other features, adjusting the strength of transmission of V2X communication signals includes reducing the strength of signal transmission according to the distance of the vehicle from the nearest one of the multiple geo-fence boundaries.

In other features, reducing the strength of signal transmission includes obtaining a minimum transmission power of the V2X communication signals and a maximum transmission power of the V2X communication signals, determining a number of power increments between the minimum transmission power and the maximum transmission power, and reducing the strength of signal transmission to a transmission value associated with one of the power increments corresponding to the distance of the vehicle from the first specified boundary distance threshold value and the second specified boundary distance threshold value.

In other features, adjusting the direction of transmission of V2X communication signals includes disabling transmission from at least one of a front vehicle V2X antenna and a rear vehicle V2X antenna, according to a direction of travel of the vehicle with respect to the nearest one of the multiple geo-fence boundaries.

In other features, the method includes, in response to determining that the vehicle is moving away from the nearest one of the multiple geo-fence boundaries, inhibiting transmission of V2X communication signals until the distance of the vehicle from the nearest one of the multiple geo-fence boundaries exceeds the specified boundary distance threshold value.

In other features, the method includes, in response to determining that the distance of the vehicle from the nearest one of the multiple geo-fence boundaries is greater than a distance check threshold value, inhibiting a next distance calculation of the vehicle from the nearest one of the multiple geo-fence boundaries for at least a first specified distance check time period.

In other features, the method includes, in response to determining that the distance of the vehicle from the nearest one of the multiple geo-fence boundaries is less than the distance check threshold value, inhibiting the next distance calculation of the vehicle from the nearest one of the multiple geo-fence boundaries for at least a second specified distance check time period, where the second specified distance check time period is shorter than the first specified distance check time period.

In other features, obtaining the prohibited V2X communication map includes communicating with a remote computing device to obtain an updated prohibited V2X communication map from a prohibited V2X communication geo-fence database.

In other features, the first specified boundary distance threshold value is at least seven hundred meters, and the second specified boundary distance threshold value is at least three hundred meters.

In other features, the V2X communication signals include at least one of vehicle-to-infrastructure (V2I) communication, vehicle-to-network (V2N) communication, vehicle-to-vehicle (V2V) communication, vehicle-to-pedestrian (V2P) communication or vehicle-to-device (V2D) communication.

In other features, the at least one antenna of the vehicle includes at least one of a vehicle front V2X communication antenna, a vehicle rear V2X communication antenna, or a vehicle side V2X communication antenna.

In other features, the locations of multiple geo-fence boundaries for regions in which V2X communication signal transmission is prohibited include at least one of a military prohibited V2X communication zone, a law enforcement prohibited V2X communication zone, and a geopolitical boundary prohibited V2X communication zone. In other features, the method includes transmitting the V2X communication signals at a frequency of 5.9 GHZ.

A vehicle-to-everything (V2X) communication system for a vehicle includes at least one antenna of a vehicle, the at least one antenna configured to transmit V2X communication signals, a global positioning system (GPS) module configured to determine a location of the vehicle, memory configured to store a prohibited V2X communication map, the prohibited V2X communication map including locations of multiple geo-fence boundaries for regions in which V2X communication signal transmission is prohibited, and at least one processor. The at least one processor is configured to obtain a current location of a vehicle, via the GPS module, determine a distance of the vehicle from a nearest one of the multiple geo-fence boundaries, and inhibit transmission of V2X communication signals from at least one antenna of the vehicle in response to a determination that the distance of the vehicle is less than a specified boundary distance threshold value.

In other features, the specified boundary distance threshold value is a first specified boundary distance threshold value, and the at least one processor is configured to allow transmission of V2X communication signals while the distance of the vehicle is greater than a second specified boundary distance threshold value, the second specified boundary distance threshold value greater than the first specified boundary distance threshold value.

In other features, the at least one processor is configured to determine whether the vehicle is currently transmitting or receiving an active event V2X communication signal, inhibit transmission of V2X communication signals in response to a determination that the distance of the vehicle is between value and the second specified boundary distance threshold value, and the vehicle is not currently transmitting or receiving an active event V2X communication signal, and allow transmission of V2X communication signals in response to a determination that the distance of the vehicle is between the first specified boundary distance threshold value and the second specified boundary distance threshold value, and the vehicle is currently transmitting or receiving an active event V2X communication signal.

In other features, the at least one processor is configured to adjust at least one of a strength of transmission of V2X communication signals and a direction of transmission of V2X communication signals, in response to the determination that the distance of the vehicle is between the first specified boundary distance threshold value and the second specified boundary distance threshold value, and the vehicle is currently transmitting or receiving an active event V2X communication signal.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
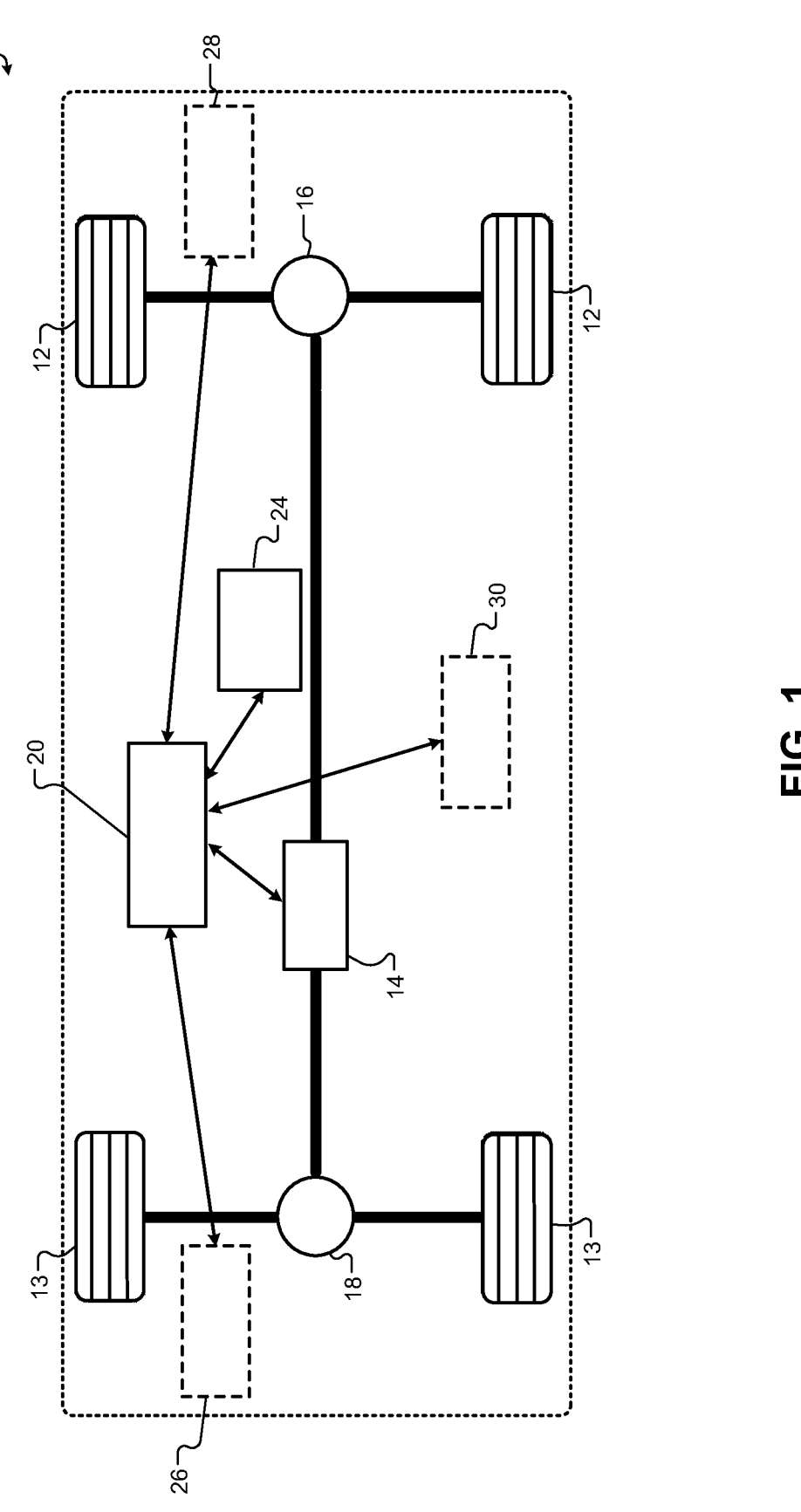
FIG. 1 is a functional block diagram of an example embodiment of a vehicle including antennas for V2X communication.

Some example embodiments includes systems and methods for dynamically determining whether a vehicle is approaching a V2X-sensitive/unauthorized area, such as a zone defined by a geo-fence where vehicle-to-everything (V2X) communication is prohibited, and determining when the vehicle should stop transmission of V2X communication signals based on a distance from the geo-fence boundary of the zone. For example, a vehicle control module may be configured to obtain a current vehicle location and a current V2X signal transmission status, and determine when to stop transmitting V2X communication signals based on one or more distance thresholds from the geo-fence boundary, where different distance thresholds may be used depending on whether the vehicle is currently transmitting V2X communications signals related to a safety event.

In some example embodiments, a system may be configured to efficiently determine how frequently the geo-fencing computation is performed. For example, the vehicle control module may only check for a nearest geo-fence boundary every minute, every ten minutes, etc. when the nearest geo-fence boundary is more than a specified distance from the vehicle (e.g., at least one mile away, at least ten miles away, at least fifty miles away, etc.).

When the vehicle is within the specified threshold distance, the vehicle control module may calculate a distance to the nearest geo-fence boundary more frequently, such as every thirty seconds, every one second, every 500 milliseconds, etc. Performing the distance check at periodic intervals in a smart/dynamic manner may reduce or minimize overheat for computing distances to nearest geo-fence boundaries. For example, by reducing redundancy of checking geo-fence before every V2X signal transmission, on-board computation by, e.g., the vehicle control module, may be reduced.

The system may use vehicle location sensing (e.g., via a global positioning system antenna, etc.), to determine whether the vehicle is approaching or departing a V2X un-authorized area. For example, different threshold distances may be used depending on whether the vehicle is approaching a V2X un-authorized area, or is leaving a V2X un-authorized area.

In some example embodiments, the vehicle control module may be configured to determine if any V2X safety applications are in an "active" state before it stops receiving V2X messages. A vehicle control module of, e.g., a host vehicle (HV), may determine whether any neighboring vehicles have an "active" V2X safety application state because of the HV's location, dynamics, etc.

An "active" state may refer to, for example, current transmission of V2X information to another vehicle, a current vehicle safety event that needs to be or is currently being transmitted between vehicles, etc. The vehicle control module may be configured to determine whether there are any active V2X authorities that the vehicle control module needs to communicate with.

Checking for active V2X applications before stopping transmission of V2X signals may facilitate performance of vehicle safety applications. For example, a vehicle control module may be configured to not stop receiving V2X messages while one or more V2X applications are active, such as receiving V2X communication signals from an approaching vehicle.

Similarly, the vehicle control module may be configured to not stop transmitting V2X communication signals while a V2X application is active, such as transmitting signals that a vehicle is currently performing hard braking. The system may use different distance thresholds depending on whether a V2X application is active. For example, the system may stop transmitting V2X communication signals at a first threshold distance form a geo-fence boundary if no safety applications are active, while permitting the vehicle to continue transmitting V2X communication signals during an active safety event up to a second threshold distance from the geo-fence boundary which is closer than the first threshold distance.

In some example embodiments, the vehicle control module may periodically obtain a current geo-fence boundary may indicating boundaries of prohibited V2X communication signal transmission. For example, V2X communication signal transmission may not be allowed in certain areas which are sensitive to V2X communication signals, such as areas where V2X communication signals may interfere with national defense communication signals, other priority signals, etc. Some countries/regions may not authorize V2X communication signal transmission, so geo-fence boundaries may correspond to border crossings of geopolitical boundaries.

Referring now to FIG. 1, a vehicle 10 includes front wheels 12 and rear wheels 13. In FIG. 1, a drive unit 14 selectively outputs torque to the front wheels 12 and/or the rear wheels 13 via drive lines 16, 18, respectively. The vehicle 10 may include different types of drive units. For example, the vehicle may be an electric vehicle such as a battery electric vehicle (BEV), a hybrid vehicle, or a fuel cell vehicle, a vehicle including an internal combustion engine (ICE), or other type of vehicle.

Some examples of the drive unit 14 may include any suitable electric motor, a power inverter, and a motor controller configured to control power switches within the power inverter to adjust the motor speed and torque during propulsion and/or regeneration. A battery system provides power to or receives power from the electric motor of the drive unit 14 via the power inverter during propulsion or regeneration.

While the vehicle 10 includes one drive unit 14 in FIG. 1, the vehicle 10 may have other configurations. For example, two separate drive units may drive the front wheels 12 and the rear wheels 13, one or more individual drive units may drive individual wheels, etc. As can be appreciated, other vehicle configurations and/or drive units can be used.

The vehicle control module 20 may be configured to control operation of one or more vehicle components, such as the drive unit 14 (e.g., by commanding torque settings of an electric motor of the drive unit 14). The vehicle control module 20 may receive inputs for controlling components of the vehicle, such as signals received from a steering wheel, an acceleration paddle, etc. The vehicle control module 20 may monitor telematics of the vehicle for safety purposes, such as vehicle speed, vehicle location, vehicle braking and acceleration, etc.

The vehicle control module 20 may receive signals from any suitable components for monitoring one or more aspects of the vehicle, including one or more vehicle sensors 24 (such as cameras, microphones, pressure sensors, wheel position sensors, location sensors such as global positioning system (GPS) antennas, etc.). The vehicle control module 20 may communicate with another device via a wireless communication interface, which may include one or more wireless antennas for transmitting and/or receiving wireless communication signals.

For example, the wireless communication interface may communicate via any suitable wireless communication protocols, including but not limited to vehicle-to-everything (V2X) communication, Wi-Fi communication, wireless area network (WAN) communication, cellular communication, personal area network (PAN) communication, short-range wireless communication (e.g., Bluetooth), etc. The wireless communication interface may communicate with a remote computing device over one or more wireless and/or wired networks.

Regarding the vehicle-to-vehicle (V2X) communication, the vehicle 10 may include one or more V2X transceivers (e.g., V2X signal transmission and/or reception antennas). As shown in FIG. 1, the vehicle 10 includes a vehicle rear V2X transceiver 26, a vehicle front V2X transceiver 28, and a vehicle side V2X transceiver 30. Other example embodiments may include more or less V2X antennas, V2X antennas at other locations on the vehicle, etc.

As used herein, V2X communication may include any suitable subset or sub-portion of V2X communication. For example, vehicle-to-everything (V2X) communication may include communication between a vehicle and any entity that may affect, or may be affected by, the vehicle. Vehicle-to-everything (V2X) communication may include one or more specific types of communication such as V2I (vehicle-to-infrastructure), V2N (vehicle-to-network), V2V (vehicle-to-vehicle), V2P (vehicle-to-pedestrian), V2D (vehicle-to-device), etc.

V2X communication may be used for any suitable communication purposes, such as road safety, traffic efficiency, energy savings, vehicle monitoring and surveillance, etc. Additional example descriptions of subcategories of V2X communication may include Vehicle-to-Device (V2D), such as Bluetooth/WiFi-Direct, Vehicle-to-Grid (V2G) (including information exchange with the smart grid to balance loads more efficiently), Vehicle-to-Building (V2B), Vehicle-to-Home (V2H), and Vehicle-to-Load (V2L).

Further examples of V2X communication may include, but are not limited to, Vehicle-to-Network (V2N) (including communication based on Cellular (3GPP)/802.11p), Vehicle-to-Cloud (V2C) (including OTA updates, and remote vehicle diagnostics (DoIP)), Vehicle-to-Infrastructure (V2I) (including communication with traffic lights, lane markers and parking meters), Vehicle-to-Pedestrian (V2P) (including communication with wheelchairs and bicycles), and Vehicle-to-Vehicle (V2V) (including real-time data exchange with nearby vehicles). As used herein, V2X communication may refer to a system that is capable of communication in only one of the above example subcategories, a system that is capable of communicating using multiple ones of the above subcategories, etc.

As shown in FIG. 1, the vehicle control module 20 may control one or more of the vehicle rear V2X transceiver 26, the vehicle front V2X transceiver 28, and the vehicle side V2X transceiver 30. For example, the vehicle control module 20 may obtain a current location of the vehicle 10 via a GPS receiver of the vehicle sensors 24, and selectively inhibit signal transmission at one or more of the vehicle rear V2X transceiver 26, the vehicle front V2X transceiver 28, and the vehicle side V2X transceiver 30, based on a determined distance of the vehicle 10 from geo-fence boundaries of prohibited V2X communication zones.

Figure 2:
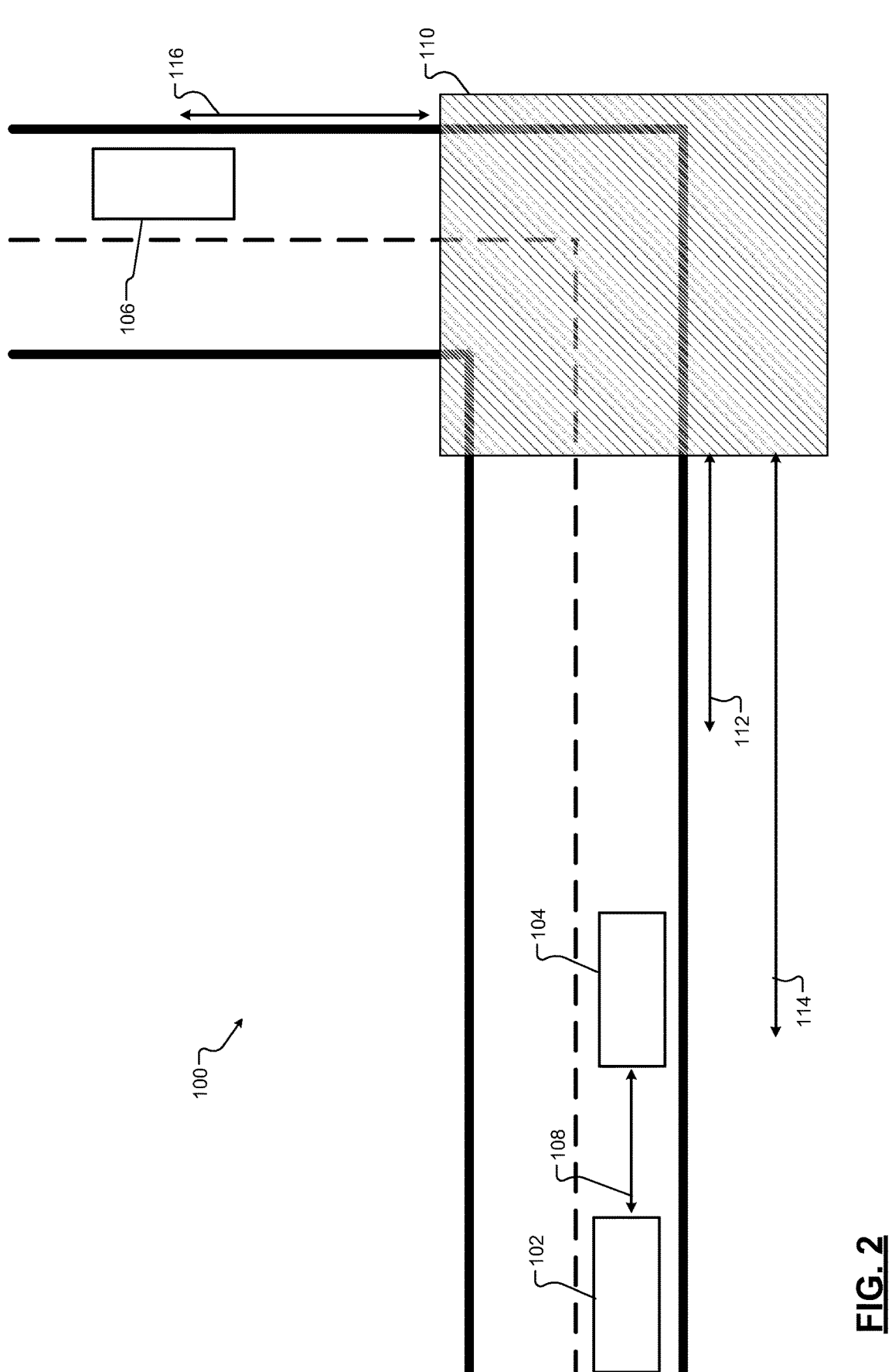
FIG. 2 is a block diagram of an example system for controlling transmission of V2X communications signals with respect to a prohibited V2X communication area.

FIG. 2 is a block diagram of an example system 100 for controlling transmission of V2X communications signals with respect to a prohibited V2X communication area. As shown in FIG. 2, a first vehicle 102 and a second vehicle 104 are approaching a V2X unauthorized area 110.

The first vehicle 102 and the second vehicle 104 are currently communicating with one another via V2X communication 108, which may include or more subcategories of V2X communication types. The third vehicle 106 is leaving the V2X unauthorized area 110.

As shown in FIG. 2, various V2X communication signal distance thresholds may be implemented, based on a direction of travel of the vehicles, whether or not a safety related V2X communication is currently active, etc. For example, a default distance threshold 114 may specify a distance at which V2X communications will be stopped if the second vehicle 104 is approaching the V2X unauthorized area and the second vehicle 104 does not currently have any active safety application V2X communications.

An active event distance threshold 112 may specify a distance at which V2X communications are stopped even if the second vehicle 104 is currently transmitting V2X communication signals for an active application. A value of the active event distance threshold 112 may be less than a value of the default distance threshold 114 (e.g., the active event distance threshold 112 is closer to the V2X unauthorized are 110 than the active event distance threshold 112).

For example, the default distance threshold 114 may include a value beyond which transmission of V2X communication signals is unlikely to significantly affect the V2X unauthorized area 110, such as at least 500 meters, at least 700 meters, at least two thousand meters, etc. The active event distance threshold 112 may include a value beyond which transmission of V2X communication signals may controlled with reduced power or change in directionality, but distances less than the active event distance threshold 112 may have a significant effect of V2X communication signals on the V2X unauthorized area 110, such as 100 meters, 300 meters, etc.

The start distance threshold 116 may include a value beyond which a vehicle leaving the V2X unauthorized area 110 may resume transmission of V2X communication signal transmission without significantly affecting the V2X unauthorized area 110. The start distance threshold 116 may be similar to the active event distance threshold 112 or the default distance threshold 114, or may be different.

Figure 3:
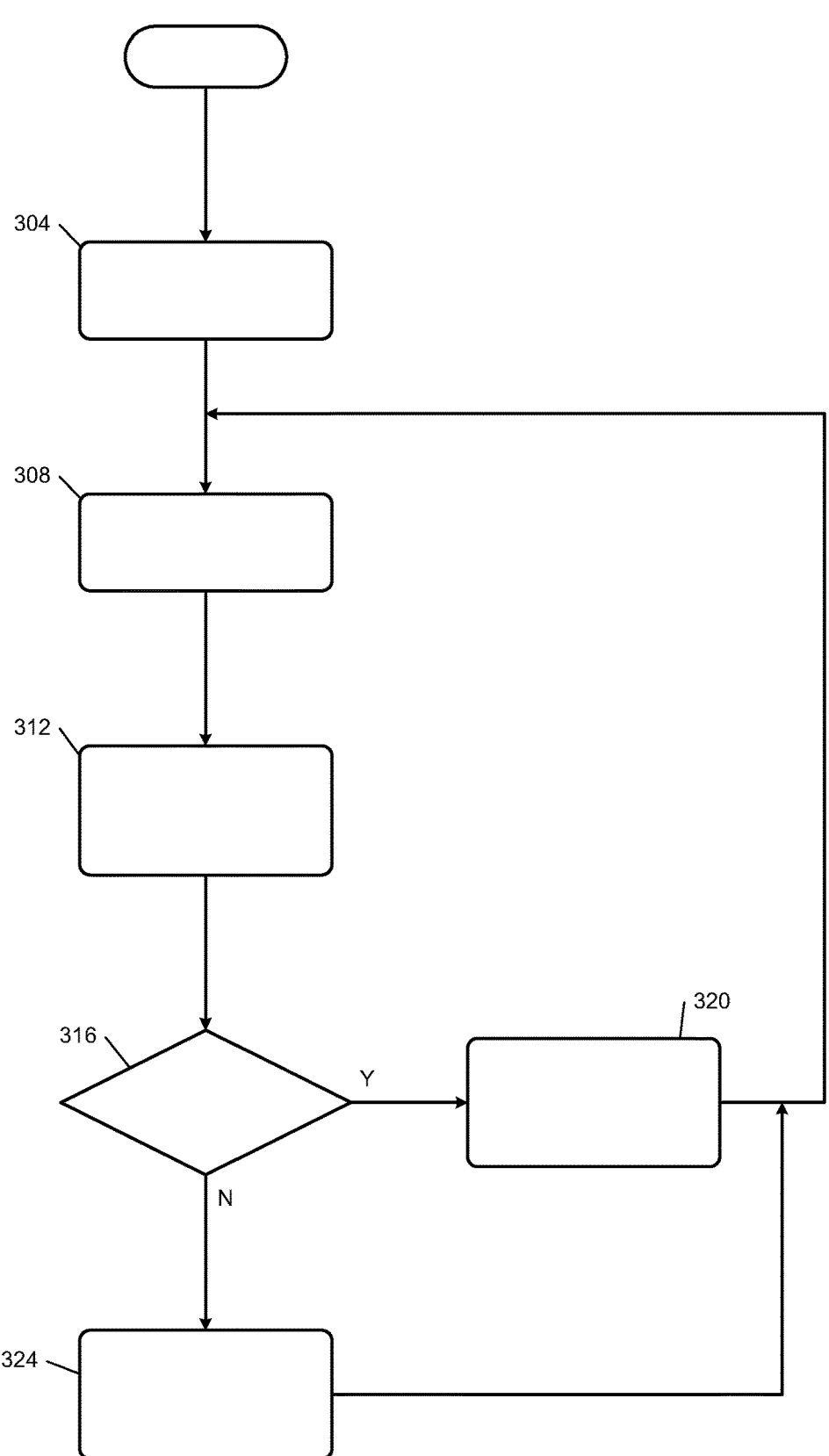
FIG. 3 is a flowchart depicting an example method of determining a distance of a vehicle from geo-fence boundaries.

FIG. 3 is a flowchart depicting an example method of determining a distance of a vehicle from geo-fence boundaries. The process may be performed by, for example, the vehicle control module 20 of FIG. 1. At 304, the method begins by obtaining prohibited V2X communication geo-fence boundaries. For example, the vehicle control module may periodically check with a database (such as a cloud database service) to determine whether there are any updated or more recent maps indicating locations of prohibited V2X communication zones. Control may download the updated map to determine distances of the vehicle from current or most recently updated geo-fence boundaries.

At 308, control obtains a current vehicle location. For example, the vehicle control module 20 may determine a location of the vehicle using a GPS receiver of the vehicle sensors 24. At 312, control determines a distance from the vehicle to a nearest geo-fence boundary.

At 316, control determines whether the distance of the vehicle from the nearest geo-fence boundary is greater than a specified short distance threshold. If so, control proceeds to 320 to pause a distance determination for a specified long distance time period.

As an example, if control determines that the vehicle is at least one mile from a nearest geo-fence boundary, at least ten miles from a nearest geo-fence boundary, at least fifty miles from a nearest geo-fence boundary, etc., control may determine that the system can wait a longer time period before making another distance calculation.

For example, if the vehicle is sufficiently far from the nearest geo-fence boundary, the vehicle control module may wait at least one minute before calculating distance again, wait at least ten minutes, etc., because the vehicle will not be able reach a geo-fence boundary within the specified long distance time period.

If control determines that the distance of the vehicle from the nearest geo-fence boundary is less than the specified distance threshold (e.g., the vehicle is close to a nearby geo-fence boundary), control proceeds to 324 to pause distance determination for the specified short distance time period.

The short distance time period may be shorter than the long distance timer period. For example, if the vehicle control module determines that the vehicle is within the specified short distance threshold of the nearby geo-fence boundary, the vehicle control module may be configured to recalculate the distance of the vehicle from the geo-fence boundary every thirty seconds, every one second, every one hundred milliseconds, etc. Using a shorter time period when the vehicle is closer to the geo-fence boundary may help to avoid a situation where the vehicle enters a prohibited V2X communication zone before next distance calculation occurs.

After pausing for either the specified short distance time period at 324, or the specified long distance time period at 320, control returns to 308 to obtain another current vehicle location, in order to update a calculated distance of the vehicle from a nearest geo-fence boundary.

Figure 4:
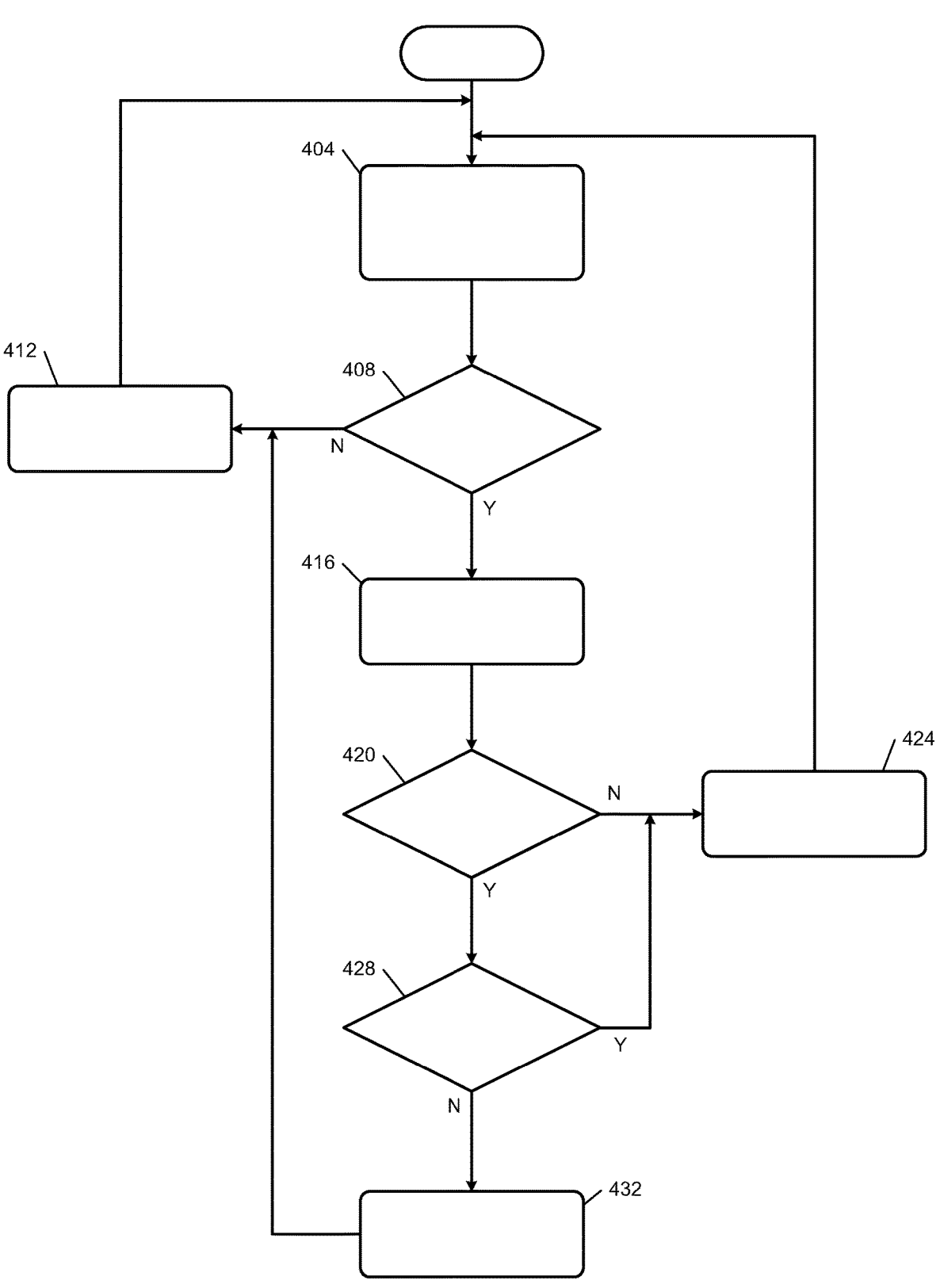
FIG. 4 is a flow chart depicting an example method of controlling transmission of V2X communication signals based on proximity to geo-fences of prohibited V2X communication areas.

FIG. 4 is a flow chart depicting an example method of controlling transmission of V2X communication signals based on proximity to geo-fences of prohibited V2X communication areas. The process may be performed by, for example, the vehicle control module 20 of FIG. 1.

At 404, the process begins by obtaining a distance of the vehicle from the nearest prohibited V2X communication geo-fence boundary. At 408, control determines whether the distance of the vehicle is less than a default transmit (Tx) distance threshold. The default transmit distance threshold may correspond to the default distance threshold 114 of FIG. 1.

If the vehicle distance is not less than the default transmit distance threshold at 408 (e.g., because the vehicle is still sufficiently far from the boundary), control proceeds to 412 to continue transmitting V2X communication signals. In this example situation, the vehicle may continue transmitting V2X communication signals because the vehicle is still far enough away from the geo-fence boundary that the V2X communication signals should not significantly affect the prohibited V2X communication zone.

If the vehicle is within the default transmission distance threshold at 408, the vehicle control module is configured to determine whether an active V2X event is present, at 416. For example, control may determine whether any safety related applications are currently communicating safety information to another vehicle.

If the vehicle does not have any active safety related applications using V2X communication at 420, control stops V2X signal transmission at 424. For example, once the vehicle passes the first distance threshold (e.g., the default distance threshold 114 in FIG. 2), if there are no safety applications currently using V2X signal transmission, the vehicle control module can safely stop transmission of V2X communication signals.

If a safety related or other specified application is presently using V2X communication at 420, control proceeds to 428 to determine whether the distance of the vehicle is less than an active event distance threshold, such as the active event distance threshold 112 of FIG. 2. If so, control stops transmission of the V2X communication signals at 428, even if the active event has not ended. For example, control may determine that passing the closer active event distance threshold means the vehicle is too close to the geo-fence boundary, so transmission of V2X communication signals should be stopped at 424 to avoid interfering with the prohibited V2X communications zone.

If control determines at 428 that the vehicle is still further away from the prohibited V2X communication zone than the specified active event distance threshold, control may adjust the V2X signal transmission at 432. An example embodiment for adjusting V2X signal transmission is described further below with reference to FIG. 5.

After adjusting the V2X signal transmission at 432, control allows V2X signal transmission to continue at 412, and obtains a new distance of the vehicle from the prohibited V2X geo-fence boundary at 404. Similarly, after stopping V2X signal transmission is stopped at 424, control returns to 404 to obtain a new distance of the vehicle from the prohibited V2X geo-fence boundary, to determine whether the vehicle can resume transmitting V2X communication signals.

Figure 5:
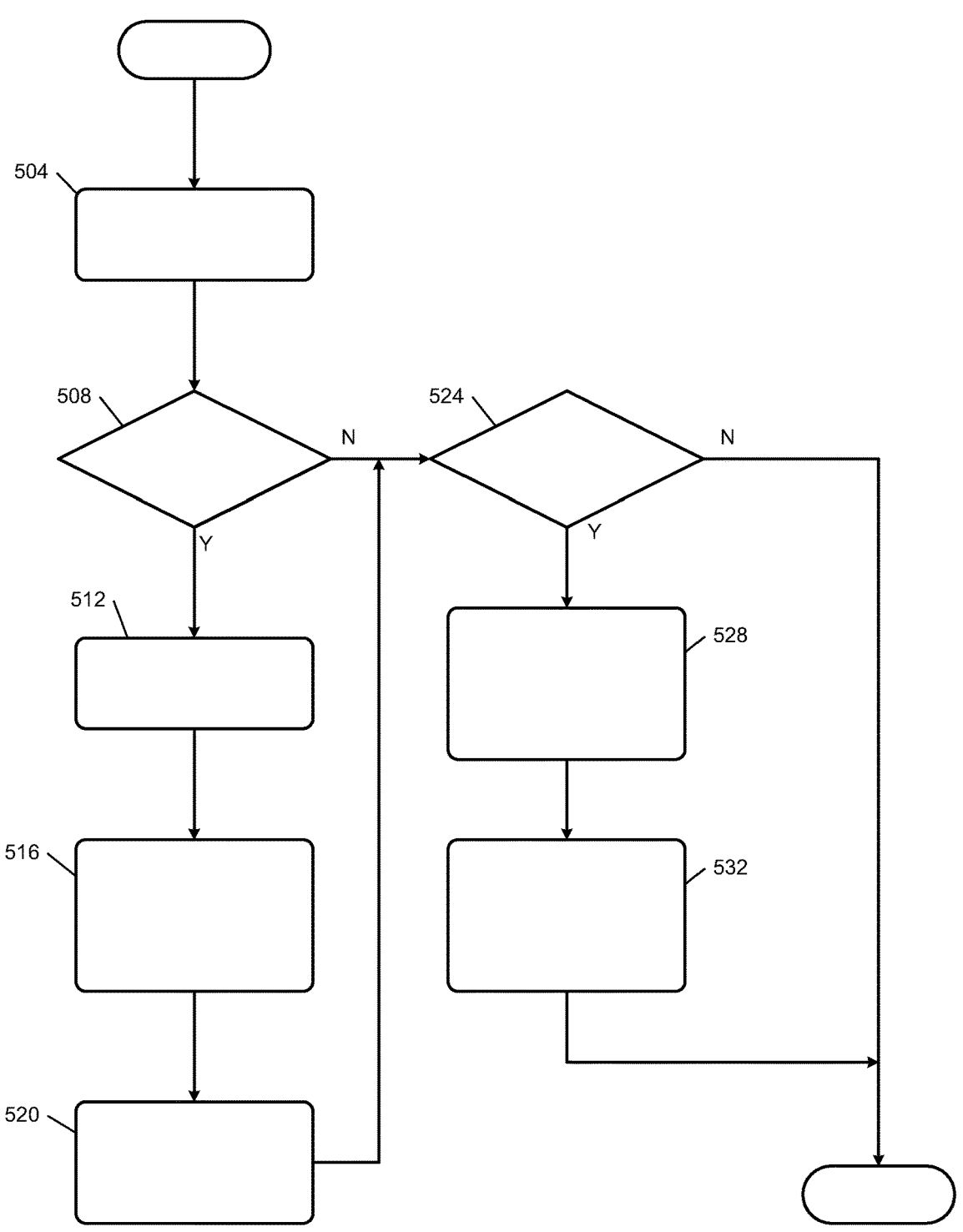
FIG. 5 is flowchart depicting an example method of adjusting transmission of V2X communication signals.

FIG. 5 is flowchart depicting an example method of adjusting transmission of V2X communication signals. The process may be performed by, for example, the vehicle control module 20 of FIG. 1. For example, if the vehicle is currently between the further normal specified distance threshold and the closer active V2X event distance threshold, and an active V2X event is currently occurring, the vehicle control module may be configured to determine reduce a signal strength and/or change a direction of transmitted V2X communication signal, in order to reduce possible effects of the transmitted V2X communication signals on the geo-fence boundary area as the vehicle approaches the geo-fence boundary area.

At 504, the vehicle control module obtains a signal adjustment protocol. For example, a vehicle setting may specify whether the vehicle control module should adjust transmission of V2X signals by reducing transmit power, changing a direction of signal transmission or both If the adjustment protocol includes a reduction in transmission power at 508, control obtains minimum and maximum power transmission values at 512. Control then determines a power adjustment value according to the minimum and maximum power values, and a number of power increments between the minimum and maximum power transmission values, at 516.

For example, a size of each power increment may be calculated by obtaining a difference between minimum and maximum transmission power values, and dividing the difference by the number of power increments. A distance range may be calculated between the normal distance threshold and the active V2X communication distance threshold.

A distance bin may be calculated by taking, e.g., a ceiling of a distance to the geo-fence boundary divided by the distance range, multiplied by the size of each power increment. The power transmission level may then be reduced based on the calculated distance bin value. In this manner, transmission power may be reduced as the vehicle gets closer and closer to the geo-fence boundary (e.g., closer and closer to the active V2X communication distance threshold). At 520, control adjusts the transmission power of the V2X communication signals according to the adjustment value.

After adjusting the transmission power at 520, or determining at 508 that a power reduction setting was not selected, control determines at 524 whether the transmission adjustment protocol specifies a change in the selected transmit antenna. If so, control proceeds to 528 to disable a front V2X antenna if the vehicle is approaching a geo-fence boundary (e.g., such that only a rear V2X antenna or side V2X antenna may transmit V2X communication signals away from the geo-fence boundary).

At 532, control disables a rear V2X antenna if the vehicle is leaving a geo-fence boundary (e.g., such that only a front V2X antenna or side V2X antenna may transmit V2X communication signals away from the geo-fence boundary). In this manner, control may adjust V2X signal transmission by reducing transmission power, changing a direction of V2X signal transmission, or both.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A method of controlling communication signal transmission in vehicle-to-everything (V2X) communication, the method comprising:

obtaining a prohibited V2X communication map, the prohibited V2X communication map including locations of multiple geo-fence boundaries for regions in which V2X communication signal transmission is prohibited;

obtaining a current location of a vehicle;

determining a distance of the vehicle from a nearest one of the multiple geo-fence boundaries;

inhibiting transmission of V2X communication signals from at least one antenna of the vehicle in response to a determination that the distance of the vehicle is less than a first specified boundary distance threshold value; and allowing transmission of V2X communication signals while the distance of the vehicle is greater than a second specified boundary distance threshold value, the second specified boundary distance threshold value greater than the first specified boundary distance threshold value.

2. The method of claim 1, further comprising:

determining whether the vehicle is currently transmitting or receiving an active event V2X communication signal;

inhibiting transmission of V2X communication signals in response to a determination that the distance of the vehicle is between the first specified boundary distance threshold value and the second specified boundary distance threshold value, and the vehicle is not currently transmitting or receiving an active event V2X communication signal; and allowing transmission of V2X communication signals in response to a determination that the distance of the vehicle is between the first specified boundary distance threshold value and the second specified boundary distance threshold value, and the vehicle is currently transmitting or receiving an active event V2X communication signal.

3. The method of claim 2, further comprising adjusting at least one of a strength of transmission of V2X communication signals and a direction of transmission of V2X communication signals, in response to the determination that the distance of the vehicle is between the first specified boundary distance threshold value and the second specified boundary distance threshold value, and the vehicle is currently transmitting or receiving an active event V2X communication signal.

4. The method of claim 3, wherein adjusting the strength of transmission of V2X communication signals includes reducing the strength of signal transmission according to the distance of the vehicle from the nearest one of the multiple geo-fence boundaries.

5. The method of claim 4, wherein reducing the strength of signal transmission includes:

obtaining a minimum transmission power of the V2X communication signals and a maximum transmission power of the V2X communication signals;

determining a number of power increments between the minimum transmission power and the maximum transmission power; and reducing the strength of signal transmission to a transmission value associated with one of the power increments corresponding to the distance of the vehicle from the first specified boundary distance threshold value and the second specified boundary distance threshold value.

6. The method of claim 4, wherein adjusting the direction of transmission of V2X communication signals includes disabling transmission from at least one of a front vehicle V2X antenna and a rear vehicle V2X antenna, according to a direction of travel of the vehicle with respect to the nearest one of the multiple geo-fence boundaries.

7. The method of claim 1, further comprising, in response to determining that the vehicle is moving away from the nearest one of the multiple geo-fence boundaries, inhibiting transmission of V2X communication signals until the distance of the vehicle from the nearest one of the multiple geo-fence boundaries exceeds the first specified boundary distance threshold value.

8. The method of claim 1, further comprising, in response to determining that the distance of the vehicle from the nearest one of the multiple geo-fence boundaries is greater than a distance check threshold value, inhibiting a next distance calculation of the vehicle from the nearest one of the multiple geo-fence boundaries for at least a first specified distance check time period.

9. The method of claim 8, further comprising, in response to determining that the distance of the vehicle from the nearest one of the multiple geo-fence boundaries is less than the distance check threshold value, inhibiting the next distance calculation of the vehicle from the nearest one of the multiple geo-fence boundaries for at least a second specified distance check time period, where the second specified distance check time period is shorter than the first specified distance check time period.

10. The method of claim 1, wherein obtaining the prohibited V2X communication map includes communicating with a remote computing device to obtain an updated prohibited V2X communication map from a prohibited V2X communication geo-fence database.

11. The method of claim 2, wherein:

the first specified boundary distance threshold value is at least seven hundred meters; and the second specified boundary distance threshold value is at least three hundred meters.

12. The method of claim 1, wherein the V2X communication signals include at least one of vehicle-to-infrastructure (V2I) communication, vehicle-to-network (V2N) communication, vehicle-to-vehicle (V2V) communication, vehicle-to-pedestrian (V2P) communication or vehicle-to-device (V2D) communication.

13. The method of claim 1, wherein the at least one antenna of the vehicle includes at least one of a vehicle front V2X communication antenna, a vehicle rear V2X communication antenna, or a vehicle side V2X communication antenna.

14. The method of claim 1, wherein the locations of multiple geo-fence boundaries for regions in which V2X communication signal transmission is prohibited include at least one of a military prohibited V2X communication zone, a law enforcement prohibited V2X communication zone, and a geopolitical boundary prohibited V2X communication zone.

15. The method of claim 1, further comprising transmitting the V2X communication signals at a frequency of 5.9 GHZ.

16. A vehicle-to-everything (V2X) communication system for a vehicle, the system comprising:

at least one antenna of a vehicle, the at least one antenna configured to transmit V2X communication signals;

a global positioning system (GPS) module configured to determine a location of the vehicle;

memory configured to store a prohibited V2X communication map, the prohibited V2X communication map including locations of multiple geo-fence boundaries for regions in which V2X communication signal transmission is prohibited; and at least one processor configured to:

obtain a current location of a vehicle, via the GPS module;

determine a distance of the vehicle from a nearest one of the multiple geo-fence boundaries;

inhibit transmission of V2X communication signals from at least one antenna of the vehicle in response to a determination that the distance of the vehicle is less than a first specified boundary distance threshold value; and allow transmission of V2X communication signals while the distance of the vehicle is greater than a second specified boundary distance threshold value, the second specified boundary distance threshold value greater than the first specified boundary distance threshold value.

17. The vehicle-to-everything (V2X) communication system of claim 16, wherein the at least one processor is configured to:

determine whether the vehicle is currently transmitting or receiving an active event V2X communication signal;

inhibit transmission of V2X communication signals in response to a determination that the distance of the vehicle is between value and the second specified boundary distance threshold value, and the vehicle is not currently transmitting or receiving an active event V2X communication signal; and allow transmission of V2X communication signals in response to a determination that the distance of the vehicle is between the first specified boundary distance threshold value and the second specified boundary distance threshold value, and the vehicle is currently transmitting or receiving an active event V2X communication signal.

18. The vehicle-to-everything (V2X) communication system of claim 17, wherein the at least one processor is configured to adjust at least one of a strength of transmission of V2X communication signals and a direction of transmission of V2X communication signals, in response to the determination that the distance of the vehicle is between the first specified boundary distance threshold value and the second specified boundary distance threshold value, and the vehicle is currently transmitting or receiving an active event V2X communication signal.

\* \* \* \* \*